2,864,775

PROCESS FOR CURING POLYEPOXIDES BY AMINE ADDUCTS AND RESULTING PRODUCTS

Herbert A. Newey, Lafayette, Calif., assignor to Shell Development Company, New York, N. Y., a corporation of Delaware No Drawing. Application September 20, 1955
Serial No. 535,525

15 Claims. (Cl. 260—2)

This invention relates to a process for curing polyepoxides. More particularly, the invention relates to a new process for curing polyepoxides with a special class of hydroxy-substituted polyamines, and to the resulting cured products.

Specifically, the invention provides a new process for curing and resinifying polyepoxides, and preferably glycidyl polyethers of polyhydric phenols and polyhydric alcohols, which comprises mixing and reacting the polyepoxide with a polyamine having at least three hydrogen atoms attached to two different amino nitrogen atoms which are in turn attached to aliphatic carbon atoms and having a hydroxyl group attached to an aliphatic carbon atom adjacent to a carbon atom bearing an amino nitrogen.

Polyepoxides, such as those obtained by reacting epichlorohydrin with polyhydric phenols in the presence of caustic, can be cured with amines, such as diethylene triamine, to form insoluble resins. The use of these amines to cure the polyepoxides, however, has not been entirely satisfactory for commercial operations. The amines as a class have rather obnoxious odors and have rather a high order of toxicity. As the curing operation is ordinarily conducted with the compositions containing the amines open to the atmosphere of the room into which some vapors of the amines permeate, the odors are quite disagreeable and sometimes cause irritation of the skin of the operators. In addition, the amines do not initiate the cure at the lower temperatures as quickly as desired for many applications.

It is an object of the invention, therefore, to provide a new method for curing polyepoxides. It is a further object to provide a method for curing polyepoxides, such as the glycidyl polyethers of polyhydric materials, with a new class of substituted amine curing agents. It is a further object to provide a new process for curing polyepoxides with curing agents which have lower volatility and a low order of toxicity. It is a further object to provide a method for curing polyepoxides which gives faster cure than with the conventional amine curing agents. It is a further object to provide a method for curing polyepoxides which give products which are hard and have solvent resistance. Other objects and advantages of the invention will be apparent from the following detailed description thereof.

It has now been discovered that these and other objects may be accomplished by the process of the invention which comprises mixing and reacting the polyepoxide with a polyamine having at least three hydrogen atoms attached to at least two different amino nitrogen atoms which in turn are attached to aliphatic carbon atoms and having a hydroxyl group substituted on an aliphatic carbon atom adjacent to a carbon atom bearing an amino nitrogen. It has been found that these particular hydroxy-substituted polyamines are far less volatile and have a lower order of toxicity than the conventional amine curing agents. It addition, the new curing agents give a faster rate of cure.

The hydroxy-substituted polyamines used as curing agents according to the process of the invention may be exemplified by the following: 1,3-diaminopropanol-2, 1,4-diaminobutanol-3, 1,6-diaminohexanol-4, 1,3-diaminohexanol-5, 1,3,6-triaminodecanol-8, N(hydroxypropyl) diethylene triamine, N(hydroxyethyl) triethylene tetraamine, N(hydroxyethyl) hexamethylene diamine, N(hydroxypropyl) pentamethylene diamine, 1,3-diamino-4-(hydroxy-ethoxy)butane, 1,4-diamino-6(hydroxypropoxy)hexane, N(2-hydroxy-4-allyloxy propyl) diethylene triamine, N(2-hydroxy-4-phenoxypropyl) ethylene diamine, N(2-hydroxy-4-isopropoxypropyl) diethylene triamine, N(2-hydroxy-2-isobutylethyl) diethylene triamine and the like, and mixtures thereof.

The preferred hydroxy-substituted polyamines to be used as curing agents are the N-hydroxyalkyl, N(hydroxyalkoxyalkyl) and N-(hydroxyalkenyloxyalkyl) aliphatic polyamines and the polyamino-substituted aliphatic alcohols, and preferably those which contain from 2 to 4 amino groups, 1 to 3 hydroxyl groups and not more than 15 carbon atoms.

Especially preferred are the hydroxy-substituted polyamines of the formulae

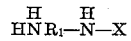

and

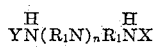

wherein $R_1$ is a bivalent aliphatic hydrocarbon radical, Y is hydrogen or a member of the group consisting of 2-hydroxyalkyl, 2-hydroxyalkoxyalkyl or 2-hydroxyalkenyloxyalkyl radicals, and X is a member of the group consisting of 2-hydroxyalkyl, 2-hydroxyalkoxyalkyl or 2-hydroxyalkenylalkyl radicals, preferably containing no more than 10 carbon atoms, and hydroxy-substituted polyamines of the formulae

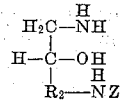

and

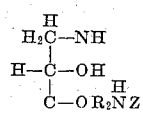

wherein $R_2$ is a bivalent aliphatic hydrocarbon radical, preferably an aliphatic hydrocarbon radical containing no more than 10 carbon atoms, and Z is a member of the group consisting of hydrogen, alkyl radicals, 2-hydroxyalkyl, 2-hydroxyalkoxyalkyl and 2-hydroxyalkenyloxyalkyl radicals.

The above-described curing agents having the hydroxy group attached to a radical joined to the amino nitrogen atom are preferably prepared by reacting monoepoxy compound with an aliphatic polyamine. Polyamines used for this purpose may be exemplified by ethylene diamine, diethylene triamine, tetraethylene pentamine, pentamethylene diamine, hexamethylene diamine, 1,10-diaminododecane, 1,4-diamino-5,8-diethyldodecane, 1,4,6-triaminodecane, 1,8-diamino-6-dodecene and 3-aminobutyl-6-aminooctane, and mixtures thereof.

The monoepoxide compounds used in making the adducts are those having a single epoxy group, i. e., a single

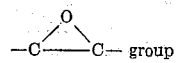

These compounds may be aliphatic, cycloaliphatic, or heterocyclic and may be saturated or unsaturated. They may also be substituted with substituents which do not react with amino or epoxy groups, e. g., ether and ester radicals and halogen atoms. Examples of these monoepoxides include, among others, ethylene oxide, propylene oxide, styrene oxide, phenyl glycidyl ether, allyl glycidyl ether, octadecyl glycidyl ether, amyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, diacrylate of the monoglycidyl ether of glycerol, 1,2-hexylene oxide, 1,2-heptylene oxide, 3-ethyl-1,2-pentylene oxide, epichlorohydrin, 1,2-decylene oxide, glycidyl acetate, glycidyl benzoate, glycidyl propionate, glycidyl acrylate, glycidyl methyl maleate, glycidyl stearate, glycidyl oleate, methyl 1,2-epoxy propionate, butyl 1,2-epoxy propionate and the like.

Preferred monoepoxides to be used to prepare the hydroxy-substituted polyamines comprising the monoepoxy-substituted hydrocarbons containing not more than 12 carbon atoms, the monoepoxy-substituted alkyl ethers of hydrocarbon monohydric alcohols or phenols containing no more than 12 carbon atoms, and the monoepoxy-substituted alkyl esters of hydrocarbon monocarboxylic acids, the epoxy-substituted alkyl esters of hydrocarbon polycarboxylic acids wherein the other carboxyl groups are esterified with alkanols, alkyl and alkenyl esters of 1,2-epoxy monocarboxylic acids, epoxy-alkyl ethers of polyhydric alcohols wherein the other OH groups are esterified or etherified with hydrocarbon acids or alcohols and monoesters of polyhydric alcohols and 1,2-epoxy monocarboxylic acids wherein the other OH groups are esterified or etherified with hydrocarbon acids or alcohols.

The adducts are prepared by mixing and reacting any one or more of the above-described aliphatic polyamines with one or more of the above-described monoepoxides.

The reaction usually is exothermic so it generally is desirable to cool the mixture to keep the temperature down. Suitable temperatures range from about 10° C. to 25° C., but higher temperatures can be used as desired.

In order to obtain the desired adducts, the components should be utilized in proper proportions. The adducts are obtained when a mol of the polyamine is reacted with not more than one mol of monoepoxide and preferably in a mol ratio of 1:1 to 2:1. The excess amine can be recovered by distillation.

The preparation of several hydroxy-substituted polyamines by the above-described process is illustrated below:

*Adduct of ethylene diamine and ethylene oxide*

600 parts of ethylene diamine was added to 100 parts of water and the mixture cooled with an ice bath. The aqueous solution was then transferred to a reaction flask equipped with stirrer, dropping funnel and condenser and 44 parts of ethylene oxide slowly added to the mixture. The mixture was kept at a temperature of about 15–20° C. for several hours and then the excess ethylene diamine and water removed by topping at reduced pressure. The product was then distilled to yield a liquid adduct identified as 2-aminoethyl ethanolamine having a boiling point of 243.7° C.

*Adduct of diethylene triamine and and ethylene oxide*

773 parts of diethylene triamine was added to 10 parts of water with cooling by means of an ice bath. The aqueous solution was then transferred to the reaction flask described above and 50 parts of ethylene oxide slowly added. After the ethylene oxide had been added, the reaction became quite exothermic and necessary to use an ice bath to keep the temperature down. After allowing to stand for several hours, the excess diethylene triamine and water were removed by topping under vacuum of about 5 mm. and ketle temperature of 140° C. The product was then distilled to yield a liquid adduct identified as N-(hydroxyethyl) diethylene triamine.

*Adduct of diethylene triamine and propylene oxide*

1030 parts of diethylene triamine and 100 parts of water were mixed in a flask cooled with an ice bath. This was transferred to a reaction flask and 59 parts of propylene oxide slowly added and the mixture cooled by means of an ice bath. The excess diethylene triamine and water were removed by topping at reduced pressure. The product was then distilled to yield a liquid adduct identified as N-(hydroxypropyl) diethylene triamine.

*Adduct of diethylene triamine and glycidol*

350 parts of diethylene triamine and 100 parts of water were mixed in a flask cooled with an ice bath. This was transferred to a reaction flask and 74 parts of glycidol slowly added and the mixture cooled by means of an ice bath. The excess diethylene triamine and water were removed by topping at reduced pressure. The product was then distilled to yield a liquid adduct identified as N-(2,3-dihydroxypropyl) diethylene triamine having a boiling point of 155–170° C. at 0.1 mm.

*Adduct of ethylene diamine and epichlorohydrin*

200 parts of sodium hydroxide was added to 900 parts of water. 3000 parts of ethylene diamine was slowly added to this aqueous sodium hydroxide solution with cooling by an ice bath. The resulting mixture was then transferred to a reaction flask as described above and 460 parts of epichlorohydrin slowly added through the dropping funnel over a period of 1 hour and 20 minutes. The mixture was kept at 20° C. for about 1 hour and then the ethylene diamine hydrate removed by distillation. The salt that crystallized out was then removed by filtration. The product was taken up in about 2500 parts of ethanol, filtered and topped to remove the ethanol. The resulting crude product was then distilled at 171–176° C. at 2 mm. of Hg to yield liquid product 1,3-(2-aminoethyl)-2-hydroxypropane.

*Adduct of diethylene triamine and phenyl glycidyl ether*

1030 parts of diethylene triamine was added to 10 parts of water with cooling. 151 parts of phenyl glycidyl ether was added slowly over a short period. After the mixture was allowed to stand for several hours, the excess diethylene triamine and water were removed by topping under vacuum. The crude product was then distilled to yield an adduct identified as N-(2-hydroxy-3-phenoxypropyl) diethylene triamine.

*Adduct of diethylene triamine and allyl glycidyl ether*

1030 parts of diethylene triamine is added to 10 parts of water with cooling. 114 parts of allyl glycidyl ether is added slowly over a short period. After the mixture has been allowed to stand for several hours, the excess diethylene triamine and water are removed by topping under vacuum. The crude product is then distilled to yield a liquid adduct N(2-hydroxy-3-allyloxypropyl) diethylene triamine.

Another method for preparing some of the above-described curing agents comprises reacting ammonia with haloepoxyalkanes, such as described in U. S. Patent 2,623,852. The preparation of the compounds by this method is illustrated below.

*Ammonia epichlorohydrin reaction product*

92 parts of epichlorohydrin was added dropwise to 100 parts of 65% aqueous ammonia at a temperature of about 30° C. After heating at that temperature for about an hour, the excess ammonia is removed. Aqueous sodium hydroxide is then added to react with the ammonia chloride and the mixture heated to remove the released ammonia and then filtered. The mixture is then heated to remove all of the water and unreacted components. The resulting product is a white crystalline product which is made up of about 15% 1,3-diamino-2-hydroxypropane which can be separated by solvent extraction and the remaining portion is made up of a dimer which is a mixture of compounds a great part of which have the structure:

and a portion having the structure:

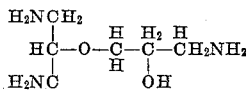

The polyepoxides may be cured with the above-described hydroxy-substituted polyamines by merely mixing the two components together. The reaction occurs slowly at temperature as low as about 20° C. and for best results it is best to heat the mixture between about 40° C. and about 200° C. Particularly preferred temperatures range from about 40° C. to about 150° C.

The amount of curing agent employed in the cure of the polyepoxides may vary over a considerable range. Amounts of adduct can range from about 5 parts per 100 parts of polyepoxide up to 40 parts per 100 parts of polyepoxide. Best results are obtained, however, when the adduct is employed in amounts varying from 10 to 30 parts per 100 parts of polyepoxide.

In curing the polyepoxide, it is usually desirable to have the polyepoxide in a mobile condition when the hydroxy-substituted polyamine is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of polyepoxide. These may be volatile solvents which escape from the polyepoxide compositions containing the adduct by evaporation before or during the curing such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons, such as trichloropropane, chloroform, etc. To save expense, these active solvents may be used in admixture with aromatic hydrocarbons such as benzene, toluene, xylene, etc. and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average equivalent weight of the polyepoxide.

Various other ingredients may be mixed with the polyepoxide subjected to cure with the hydroxy polyamines including pigments, fillers, dyes, plasticizers, resins, and the like.

One important application of the use of the new adducts as curing agents for polyepoxides is in the preparation of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like. It is useful to prepare the laminates from woven glass cloth that has been given prior treatment with well known finishing or sizing agents therefor, such as chrome methacrylate or vinyl trichlorosilane.

In preparing the laminate, the sheets of fibrous material are first impregnated with the mixture of the polyepoxide and adduct. This is conveniently accomplished by dissolving the adduct in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C., preferably to about 20° C. to 25° C. A plurality of the impregnated sheets are then superimposed and the assembly is cured in a heated press under a pressure of about 25 to 500 or more pounds per square inch. The resulting laminate is extremely strong and resistant against the action of organic and corrosive solvents.

The compositions of the invention are also useful for protective coatings. In this application they are preferably dissolved in an organic solvent and this mixture applied to the desired surface. Various solvents are suitable for this purpose such as lower saturated ketones like acetone, methyl ethyl ketone, methyl isobutyl ketone, methyl hexyl ketone, cyclohexanone, methyl cyclohexanone, etc.; esters like ethyl acetate, isopropyl acetate, butyl acetate, isoamyl acetate, etc.; and monoalkyl ethers of ethylene glycol like methyl, ethyl or butyl ethers. Preferably such solvents having a boiling point below 175° C. If desired, other materials like lower aromatic hydrocarbons such as benzene, toluene and/or xylene may be used in combination with the oxygen-containing compounds for the purpose of cheapening the cost of the solvent.

The solutions of the compositions of the invention are applied for coating surfaces needed to be protected by brushing, spraying and the like. The amount of solvent contained in the solution may be varied to suit the particular need. Ordinarily, the solution will contain about 5% to 60% of the composition of the invention. The solution is applied to the surface to be coated, and either the solvent is first allowed to evaporate, after which heat is applied by circulating hot air or by use of infra-red lamps, or the heating is effected with simultaneous removal of solvent and curing.

When used as film-forming agents, the compositions may have various other materials incorporated therewith besides solvents such as pigments and other resins. Thus pigments like titanium oxide, antimony oxide, carbon black, chrome yellow, zinc oxide, para red, and the like, may be used. Best results in preparing the enamels are obtained by grinding the pigment with a portion of the solvent and epoxy ether, and then adding the remainder of the solvent and epoxy ether after the grinding operation. The enamel is ready for application upon addition of the curing agent.

The polyepoxides to be cured by use of the above process are those organic compounds containing a plurality of epoxy groups, i. e.,

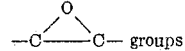

These compounds may be saturated or unsaturated, aliphatic, cycloaliphatic, aromatic or heterocyclic and may be substituted if desired with substituents, such as halogen atoms, OH groups, ether radicals, and the like.

For clarity, polyepoxides and particularly those of the polymeric type are preferably described in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyepoxide material consists of a single compound and all of the epoxy groups are intact, the epoxy equivalency will be integers, such as 2,3,4, and the like. However, in the case of polymeric-type polyether polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5, and the like.

Examples of polyepoxides suitable for use in the present process are given in U. S. 2,633,458 and it is understood that so much of the disclosure of that patent relative to polyepoxides is incorporated by reference into this specification.

To illustrate the manner in which the invention may be carried out, the following examples are given. It is to be understood, however, that the examples are for the purpose of illustration and the invention is not to be regarded as limited to any of the specific materials or conditions recited therein.

The polyethers referred to in the examples such as, for example, Polyether A, are those described in U. S. 2,633,458.

*Example I.*—This example illustrates the use of the adduct of diethylene triamine and ethylene oxide produced as shown above as a curing agent for a glycidyl polyether of 2,2-bis(4-hydroxyphenyl) propane having a molecular weight of about 350 and an epoxy value of 0.50 eq./100 g. (Polyether A).

100 parts of Polyether A was mixed with 15.5 parts of the diethylene triamine-ethylene oxide adduct. This mixture could be easily handled and did not have the high toxicity of mixtures containing the diethylene triamine by itself. The time for gelation of the mixture at 25° C. was 84 minutes as compared to 126 minutes for a similar composition containing diethylene triamine.

Castings were prepared by heating 100 parts of Polyether A with 15.5 parts of the diethylene triamine-ethylene oxide adduct at 60° C. for several hours. The resulting products were light yellow hard castings. They showed good hardness even after being placed in boiling water for 3 hours and after being placed in boiling acetone for 3 hours.

*Example II.*—This example illustrates the use of the adduct of diethylene triamine and glycidol produced as shown above as a curing agent for Polyether A.

100 parts of Polyether A was mixed with 23 parts of the diethylene triamine-glycidol adduct. This mixture could be easily handled and did not have the high toxicity of the mixtures containing the diethylene triamine as the curing agent. The mixture gelled in a short time after mixing.

Castings were prepared by heating 100 parts of Polyether A with 23 parts of the diethylene triamine-glycidol adduct at 80° C. The resulting products were light yellow hard castings which maintained their hardness even after being placed in boiling water and in boiling acetone for 3 hours.

*Example III.*—This example illustrates the use of the adduct of ethylene diamine and ethylene oxide produced as shown as a curing agent for Polyether A as described in U. S. 2,633,458.

100 parts of Polyether A was mixed with 20 parts of the ethylene diamine-ethylene oxide adduct. This mixture could be easily handled and did not have the high toxicity of mixtures containing the ethylene diamine as curing agent. The time for gelation of the mixture at 25° C. was 75 minutes as compared to 138 minutes for a similar composition containing ethylene diamine.

Castings were prepared by heating 100 parts of Polyether A with 23 parts of the ethylene diamine-ethylene oxide adduct at 80° C. The resulting products were light yellow colored castings which maintained their hardness even after being placed in boiling water and in boiling acetone for 3 hours.

*Example IV.*—This example illustrates the use of the adduct of ethylene diamine and ethylene oxide as a curing agent for adhesive composition containing Polyether B and allyl glycidyl ether.

90 parts of Polyether B and 10 parts of allyl glycidyl ether were mixed with aluminum oxide and with 10 parts of the ethylene diamine-ethylene oxide adduct. This mixture was also easily handled and had less toxicity than similar composition containing ethylene diamine as the curing agent. The mixture set up in 76 minutes at room temperature. A portion of the mixture before gelation was placed two pieces of aluminum and the combination heated at 140° C. for several hours. At that time adhesive had set to form a very strong bond.

Related results were obtained by replacing the mixture of Polyether B and allyl glycidyl ether in the above experiment with the following mixtures:

Polyether B–90 parts and allyl glycidyl ether 10 parts; Polyether B–75 parts and Polyether F–25 parts; Polyether; and Polyether B–80 parts and allyl glycidyl ether–20 parts.

*Example V.*—An adhesive composition similar to that prepared in Example IV was prepared by mixing 75 parts of Polyether B, 25 parts of Polyether F, 8 parts of acetonitrile, 4 parts of vinylite AYAF, 75 parts of asbestos and 10 parts of the ethylene diamine-ethylene oxide adduct. This mixture was easily handled and had less toxicity than similar composition containing ethylene diamine as the curing agent. A portion of this mixture was placed between two pieces of aluminum and the combination heated at 140° C. for several hours. At that time the adhesive had set up to form a very strong bond.

*Example VI.*—This example illustrates the use of the adduct of ethylene-diamine and epichlorohydrin as produced above as a curing agent for Polyether A.

100 parts of Polyether A was mixed with 15.5 parts of the adduct of ethylene-diamine and epichlorohydrin. This mixture could be easily handled and did not have the high toxicity of the mixtures containing the ethylene-diamine as the curing agent. The mixture gelled in 72 minutes as compared to 138 minutes for a similar composition containing ethylene-diamine.

Castings were prepared by heating 100 parts of Polyether A with 23 parts of the ethylene-diamine-epichlorohydrin adduct at 80° C. The resulting products were light yellow hard castings which had a Barcol hardness of 30 after being placed in boiling water for 3 hours and a hardness of 29 after being placed in boiling acetone for 3 hours.

*Example VII.*—This example illustrates the use of the adduct of diethylene triamine and propylene oxide produced as shown above as a curing agent for Polyether A.

100 parts of Polyether A was mixed with 20 parts of the diethylene-triamine-propylene oxide adduct. This mixture could be easily handled and did not have the high toxicity of mixtures containing the diethylene-triamine as the sole curing agent. The mixture gelled in a short time at 25° C.

Castings were prepared by heating 100 parts of Polyether A with 20 parts of the diethylene-triamine-propylene oxide adduct at 80° C. The resulting products were light yellow hard castings which retained their hardness after being placed in boiling water for 3 hours and after being placed in boiling acetone for 3 hours.

*Example VIII.*—This example illustrates the use of the adduct of diethylene-triamine and phenyl glycidyl ether produced as shown above as a curing agent for Polyether A.

100 parts of Polyether A was mixed with 15 parts of the diethylene-triamine-phenyl glycidyl ether adduct. This mixture could also be easily handled and did not have the high toxicity of mixtures containing the diethylene-triamine as the sole curing agent. The time for gelation at 25° C. was 84 minutes as compared to 126 minutes for a similar composition containing diethylene-triamine.

*Example IX.*—This example illustrates the use of 1,3-diaminopropanol-2 as the curing agent for Polyether E.

100 parts of Polyether E was mixed with 100 parts of solvent and 10 parts of 1,3-diaminopropanol-2 and the mixture heated at 100° C. in a few minutes the mixture had set to form a hard clear coating.

An adhesive composition was prepared by mixing 50 parts of Polyether B and 50 parts of Polyether F with aluminum oxide and 10 parts of 3-diaminopropanol-2. This mixture was easily handled and had a low order of toxicity. A portion of the mixture was placed between two pieces of aluminum and the mixture allowed to stand at 25° C. The adhesive soon set up to form a strong flexible bond.

*Example X.*—This example illustrates the use of 2-(3-amino-2-hydroxy-propoxy) 1,3-diamino propane as curing agent for Polyether A.

100 parts of Polyether A was mixed with 20 parts of 2-(3-amino-2-hydroxy propoxy) 1,3-diamino-propane. The mixture could be easily handled and had a low order of toxicity. The mixture was heated at 80° C. and rapidly set up to form a hard casting having good resistance to solvents and water.

*Example XI.*—This illustrates the use of an adduct of diethylene triamine and allyl glycidyl ether as a curing agent for Polyether A.

100 parts of Polyether A is mixed with 25 parts of the adduct of diethylene-triamine and allyl glycidyl ether. The mixture could be easily handled and had a low order of toxicity. The mixture is heated at 80° C. and readily sets up to form a hard yellow casting having good resistance to water and acetone.

*Example XII.*—This example illustrates the use of an adduct of diethylene-triamine and allyl glycidyl ether as a curing agent for Polyether B.

100 parts of Polyether B is mixed with 20 parts of the adduct of diethylene-triamine and allyl glycidyl ether. The mixture is less toxic than similar mixture containing the diethylene-triamine itself. The mixture is heated at 65° C. and readily sets up to form a hard casting having good resistance to boiling water and acetone.

I claim as my invention:

1. A process for producing an insoluble resinified product which comprises mixing and reacting a polyepoxide having

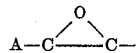

epoxy equivalency greater than 1.0 with from 5 to 40 parts per 100 parts of polyepoxide of an adduct of (1) a member of the group consisting of aliphatic polyamines having terminal primary amine groups and ammonia, and (2) a monoepoxide containing no more than 12 carbon atoms, said adduct having at least three hydrogen attached to two different amino nitrogen atoms and having a hydroxyl group attached to an aliphatic carbon atom which is adjacent to a nitrogen-bearing carbon atom.

2. A process as in claim 1 wherein the curing agent is 1,2-diamino propanol-2.

3. A process as in claim 1 wherein the curing agent is a reaction product of epichlorohydrin and ammonia.

4. A process for producing an insoluble resinified product which comprises mixing and reacting a glycidyl polyether having

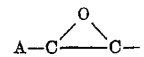

epoxy equivalency greater than 1.0 with from 5 to 40 parts per 100 parts of the glycidyl polyether of an adduct of an aliphatic polyamine having terminal primary amine groups and an aliphatic monoepoxide containing no more than 12 carbon atoms in mole to mole ratio, said adduct having at least three hydrogen attached to two different amino nitrogen atoms and having a hydroxyl group attached to an aliphatic carbon atom which is adjacent to a nitrogen-bearing carbon atom.

5. A process as defined in claim 4 wherein the polyepoxide is a glycidyl polyether of a polyhydric phenol having a 1,2-epoxy equivalency between 1.0 and 2.0 and a molecular weight between 200 and 900.

6. A process as in claim 4 wherein the polyepoxide is a glycidyl polyether of a polyhydric alcohol having an epoxy equivalency between 1.1 and 3 and a molecular weight between 170 and 800.

7. A process as in claim 4 wherein the monoepoxide used in making the adduct is an epoxy substituted hydrocarbon.

8. A process as in claim 4 wherein the monoepoxide used in making the adduct is an epoxy haloalkane.

9. A process as in claim 4 wherein the monoepoxide used in making the adduct is a monoepoxyalkyl ether.

10. A process as in claim 4 wherein the monoepoxide used in making the adducts is a glycidyl ester of a monocarboxylic acid.

11. A process for producing an insoluble resinified product which comprises heating and reacting a glycidyl polyether of a polyhydric material of the group consisting of polyhydric phenols and polyhydric alcohols with from 5 to 40 parts per 100 parts of the glycidyl polyether of an adduct of an aliphatic diamine having terminal primary amine groups and a monoepoxide possessing no more than 12 carbon atoms in a 1:1 mole ratio and heating to a temperature between 40° C. and 150° C., said adduct having at least three hydrogen attached to two different amino nitrogen atoms and having a hydroxyl group attached to an aliphatic carbon atom which is adjacent to a nitrogen-bearing carbon atom.

12. A process as in claim 11 wherein the curing agent is an adduct of diethylene triamine and allyl glycidyl ether.

13. A process as in claim 11 wherein the curing agent is an adduct of diethylene triamine and glycidol.

14. A process as in claim 11 wherein the curing agent is an adduct of epichlorohydrin and diethylene triamine.

15. A process as in claim 11 wherein the curing agent is an adduct of ethylene diamine and ethylene oxide.

References Cited in the file of this patent

UNITED STATES PATENTS

| | | |
|---|---|---|
| 2,585,115 | Greenlee | Feb. 12, 1952 |
| 2,651,589 | Shokal | Sept. 8, 1953 |
| 2,723,241 | De Groote et al. | Nov. 8, 1955 |

FOREIGN PATENTS

| | | |
|---|---|---|
| 681,105 | Great Britain | Apr. 28, 1950 |
| 503,546 | Belgium | May 26, 1951 |